United States Patent Office 3,513,126
Patented May 19, 1970

3,513,126
PROCESS FOR MAKING AQUEOUS MELAMINE FORMALDEHYDE RESINOUS COMPOSITIONS
Johann F. Ehlers, Tuxedo, and Jorge A. Cremaschi, Suffern, N.Y., and Alvaro Salgado, Mahwah, N.J., assignors to Reichhold Chemicals, Inc., White Plains, N.Y.
No Drawing. Continuation of application Ser. No. 542,745, Apr. 15, 1966. This application Mar. 25, 1969, Ser. No. 810,930
Int. Cl. C08g 9/24
U.S. Cl. 260—51.5       13 Claims

ABSTRACT OF THE DISCLOSURE

An aqueous melamine formaldehyde process suitable for forming laminated structures having desirable postforming properties, prepared by reacting melamine and formaldehyde in the molecular range of about two moles of formaldehyde per mole of melamine to about one mole of formaldehyde per mole of melamine, together with a certain specified reducing agent selected from a group consisting of hydroquinone, glycine and o-phenylenediamine in the range of approximately 0.5 to approximately 2.0 percent by weight of the melamine contained therein at the pH value ranging from about 8.6 to 9.3.

---

This application is a continuation of application Ser. No. 542,745, filed Apr. 15, 1966, and now abandoned.

The invention relates to a composition for making novel melamine-formaldehyde resins.

More particularly, the invention relates to a melamine-formaldehyde resin composition formed primarily from melamine and formaldehyde within certain specified molar ranges, together with relatively small quantities of reducing agents which may be either inorganic or organic in nature. Small quantities of modifying agents may, if desired, be employed along with the essentail or principal ingredients, namely, melamine, formaldehyde, and a reducing agent, without departing from the spirit of the invention, though it will be understood by those skilled in the art that such addition may be omitted, if desired.

It is an object of this invention to prepare a novel modified melamine-formaldehyde resin, particularly adapted for laminating resins.

It is another object of this invention to prepare a composition which imparts postforming properties to the resin impregnated laminate, made from said composition, without undue sacrifice of surface properties.

It is a further object of this invention to prepare an aqueous-acetone solution of a modified melamine-formaldehyde resin, which is stable over extended periods.

It is still further an object to prepare a ketone modified melamine-formaldehyde resin, which has a novel combination of advantageous properties in the preparation of decorative lamination, particularly as to gloss and clarity of the surface.

Still further objects become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The composition is desirable within the range of about two moles of formaldehyde to about one mole of melamine as the upper limit of formaldehyde to melamine mole ratio and about one mole of formaldehyde to about one mole of melamine as the lower limit of formaldehyde to melamine mole ratio and about preferably in the range of about 1.5 moles of formaldehyde to about 1.0 mole of melamine as the lower limit, and within the range of about 1.8 moles of formaldehyde to about 1 mole of melamine as the upper limit. Small quantities of suitable reducing agents, singly or in combination, are charged to the reactor with melamine and formaldehyde in the range of approximately 0.5 percent to approximately 2.0 percent by weight of the melamine contained and preferably in the range of approximately 0.5 percent to approximately 1.0 percent. Suitable reducing agents include hydroquinone, glycine and o-phenylenediamine and the like.

It is important that melamine and formaldehyde be reacted within the limits of the mole ratio of formaldehyde to melamine, described above. If the reactants are present in our composition in ratios of formaldehyde to melamine that are higher than the ratio described above, the desirable postforming properties of the laminated structures made from these resins are impaired or lost.

If, for example, the resin is made according to the procedure described above, except that the mole ratio of formaldehyde to melamine is 2.5:1.0 then the laminated structure made therefrom will not postform.

It is equally important that the quantity of the reducing agent used in said composition be limited to the range of approximately 0.5 to approximately 2.0 percent, based on melamine. Any amount higher than the one portrayed above will impair or eliminate the postforming properties of the laminated structures made from these resins. If the resin is made in accordance with the procedure described above, except that the reducing agent is omitted as constituent of the reaction, then the laminated structure made therefrom will not postform. Conversely, if the resin is made in accordance with the procedure described above but the amount of the reducing agent is approximately 5 to approximately 10 percent of the melamine contained, then the laminated structure made therefrom will not postform.

It is, therefore, believed that it is the positive interaction of the melamine formaldehyde condensation product in the specified range of mole ratios and in the presence of the reducing agent within the specified range which achieves the desired property of postformability in the laminated structure made therefrom.

While prior art has taught the use of sodium bisulfite in substantial quantities for the purpose of preparing a resin composition which could be employed in the manufacture of resin-impregnated paper laminates, these laminate structures lacked in postformability. We have unexpectedly discovered that reducing agents, including but not limited to sodium bisulfite in the range of approximately 0.5 to approximately 2.0 percent of the melamine content, will provide the laminated structure made from said resin with the desired ability to postform.

As a means of imparting stability to the aqueous resin solution, small quantities of urea may be included in the resin composition as a coreactant with melamine and formaldehyde, preferably in the range of approximately 5 to approximately 10 percent by weight of the melamine contained. Urea is added after the reaction has proceeded to the point of hydrophobe at two to three degrees centigrade. At the point of hydrophobe at two to three degrees centigrade, ketones such as acetone may be added in the range of approximately 5 to approximately ten percent by weight of melamine contained, as a means of imparting improved surface properties to the laminated structure made from the resin described and particularly in respect to the gloss and clarity of the surface.

Other ketones such as methylethylketone, methyl n-propylketone, diethylketone, hexanone - 2, hexanone - 3, methyl t - butylketone, di - n - propyl ketone, diisopropylketone, diisobutylketone, di - n - amylketone and the like may be used. However, it is generally preferred to use acetone because of the outstanding results obtained therewith.

The laminated structures made therefrom possess superior properties of postformabiltiy without the loss of important surface properties such as abrasion resistance, usually associated with laminated structures which will not postform.

Ketones such as acetone also aid substantially in improving stability to the aqueous resin solutions in that they extend low temperature stability and shelf-life.

As a further means of imparting stability small quantities of an alkanolamine such as monoethanolamine may be included in the resin composition as a coreactant with the agents described above, preferably within the range of approximately 0.5 to approximately 1.0 percent of melamine contained. Other alkanolamines such as diethanolamine, triethanolamine, monopropanolamine, dipropanolamine, tripropanolamine, monoisopropanolamine, diisopropanolamine, triisopropanolamine, monobutanolamine, dibutanolamine, tributanolamine and the like, may be used. However, it is generally preferred to use monoethanolamine because of the outstanding results obtained therewith.

The addition should be made at the end of the reaction.

It has been found that the addition of the modifying agents increases the efficiency of the resins at a water tolerance of 50 percent to 300 percent. At that water tolerance the resins are equally effective and useful with undiminished postformability and undiminished retention of gloss and other surface properties of the laminated structure prepared therefrom.

Further, it has been found that low temperature characteristics are vastly improved over other known resins. Gelling of melamine resin solutions at freezing temperatures (0°–5°) are commonplace. This gelling occurs and remains permanent when said melamine resin solutions are subjected to freezing temperatures. They can no longer be reverted to the original liquid stage, even upon application of heat. However, the resin solutions, as described in this invention remain stable for an extended period. Insignificant gelling which might occasionally occur can be overcome by application of ambient temperature in that said resin solution will revert itself to its original liquid stage.

The invention will be more readily understood by reference to the accompanying specific examples, which are intended as illustration only rather than as limiting the invention to the specific details set forth therein, except as defined in the accompanying claims.

EXAMPLE 1

2170 parts of formaldehyde 37 percent and 485 parts of water are charged to a stainless steel reactor, equipped with an agitator and reflux condenser. The pH of the solution is adjusted to about 8.6–9.0 and 1720 parts of melamine are added. The slurry is then heated to 90° C. within 30–45 minutes and held at this temperature until hydrophobe is reached at 2–3° C. The reaction product is subsequently cooled to 84–86° C., held at this temperature to a water tolerance of 210–230 percent and 10 parts of borax and 65 parts of isopropanol were added immediately while cooling to 35–40° C. The pH is adjusted to 9–9.3 with caustic soda solution, if necessary. The laminate obtained, using the resin from above sample, did not postform.

EXAMPLE 2

Same procedure as for the preparation of the resin in Example 1. 10 parts of hydroquinone were added with the water.

Resin constants:
Appearance—clear red solution
Percent N.V.—53.0
Viscosity—faster than A. Gardner
Water tolerance—125 percent
pH at 25° C.—9.5.

EXAMPLE 3

Same procedure is used for the preparation of the resin as in Example 1. 15 parts of o-phenylenediamine were added with the water.

Post-forming test: pass ¾" at 275; 325; 375° F.; pass ½" at 275 and 325° F.; partially pass ⅜" at 275 and 325° F.

EXAMPLE 4

Same procedure is used for the preparation of the resin as in Example 1. 15 parts of glycine (amino acetic acid) were added with the water.

Post-forming test: pass ¾" at 275, 325, 375° F.; pass ½" at 275 and 325° F.; pass ⅜" at 275 and 325° F.

The term "post-formability" means the ability of the laminate to bend and resist breakage after formation, under heated condition.

The test is performed according to the method outlined under No. LP 2–2, 11 of the Standards Publication of the National Electrical Manufacturers Association.

The laminate is pressed at various temperatures with the decorative face in tension against a notch block having a radius of ¾" or ½" or ⅜". The result is recorded as "pass" or "not pass" at the specific temperature.

Where the term "parts" is used in the present specification and claims, it will be understood that "parts by weight" is intended.

What is claimed is:

1. A process for producing an aqueous melamine formaldehyde resinous composition suitable for forming laminated structures having desirable post-forming properties, comprising reacting melamine and formaldehyde in the molecular range of about two moles of formaldehyde per mole of melamine to about one mole of formaldehyde per mole of melamine, together with water and a reducing agent selected from a group consisting of hydroquinone, glycine and o-phenylenediamine within the range of approximately 0.5 to approximately 2.0 percent by weight of the melamine contained therein at a pH value ranging from about 8.6 to 9.3.

2. A process as set forth in claim 1, wherein the reducing agent is employed within the range of approximately 0.5 to approximately 1.0 percent by weight of the melamine.

3. A process as set forth in claim 1 wherein the reducing agent comprises hydroquinone.

4. A process as set forth in claim 1 wherein the reducing agent comprises glycine.

5. A process as set forth in claim 1 wherein the reducing agent comprises o-phenylenediamine.

6. A process as set forth in claim 1 wherein a small quantity of urea is included.

7. A process as set forth in claim 6 wherein urea is employed within the range of approximately 5 to approximately 10 percent by weight of the melamine content.

8. A process as set forth in claim 1 wherein a ketone is included.

9. A process as set forth in claim 1 which includes acetone in the proportion of approximately 5 to approximately 10 percent by weight of the melamine employed.

10. A process as set forth in claim 1 wherein an alkanolamine is included in the composition.

11. A process as set forth in claim 10 wherein the alkanolamine is ethanolamine.

12. A process as set forth in claim 1 wherein borax is included in the composition.

13. A process as set forth in claim 1 wherein isopropanol is included.

References Cited

FOREIGN PATENTS 548,658 11/1957 Canada.
919,808 2/1963 Great Britain.

MURRAY TILLMAN, Primary Examiner

M. J. TULLY, Assistant Examiner

U.S. Cl. X.R.

260—29.4, 32.6, 32.8, 67.6